Figure 10:
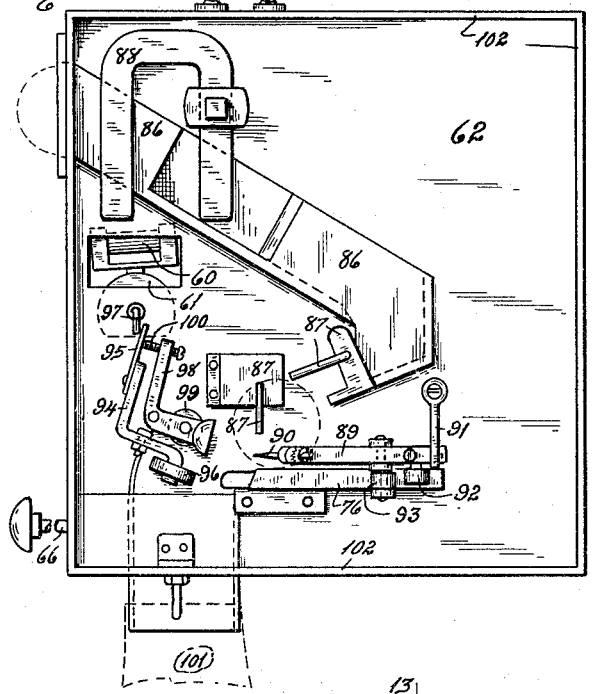

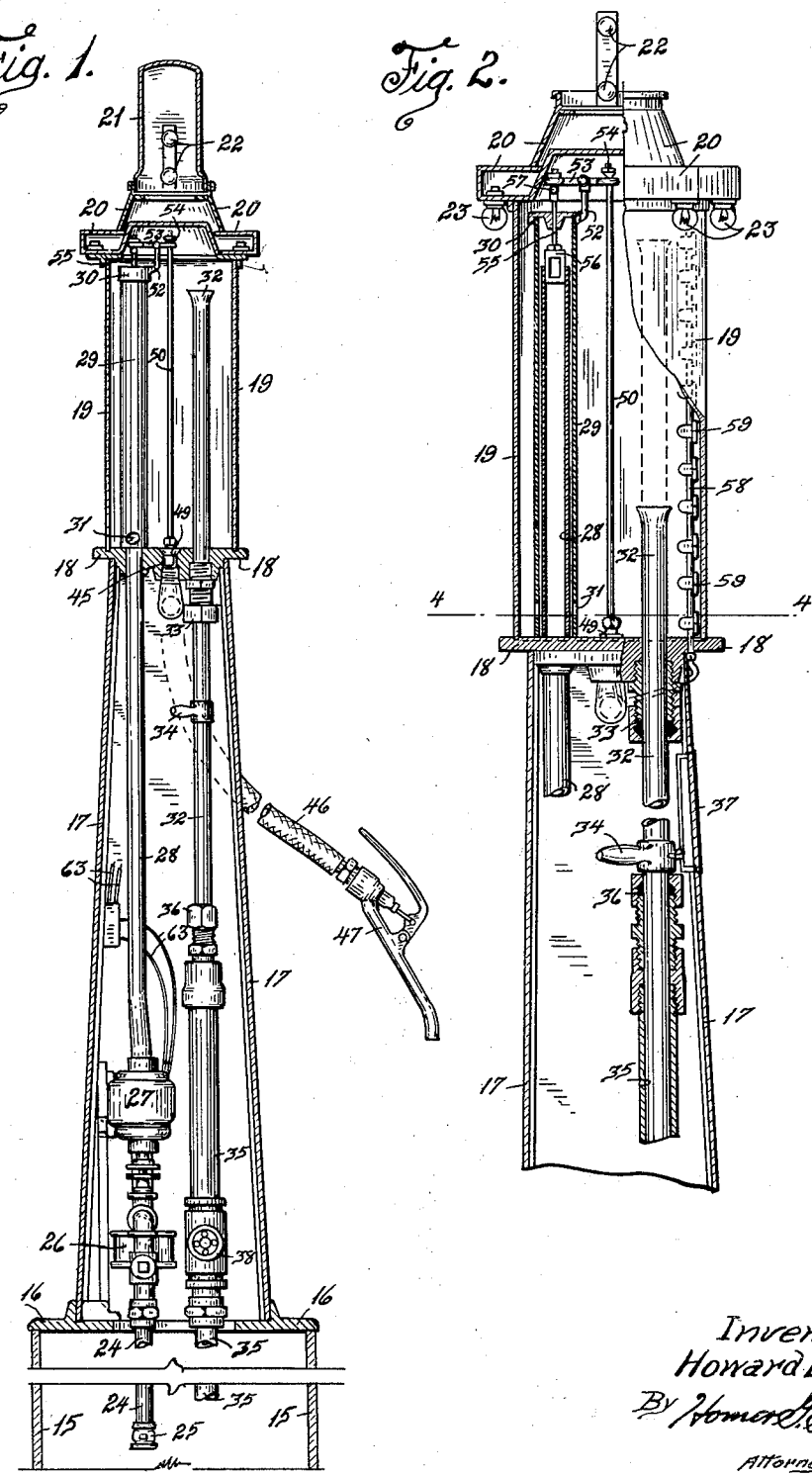

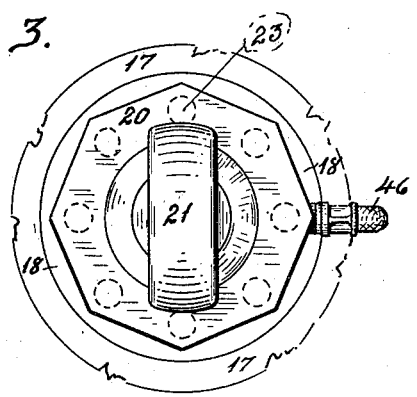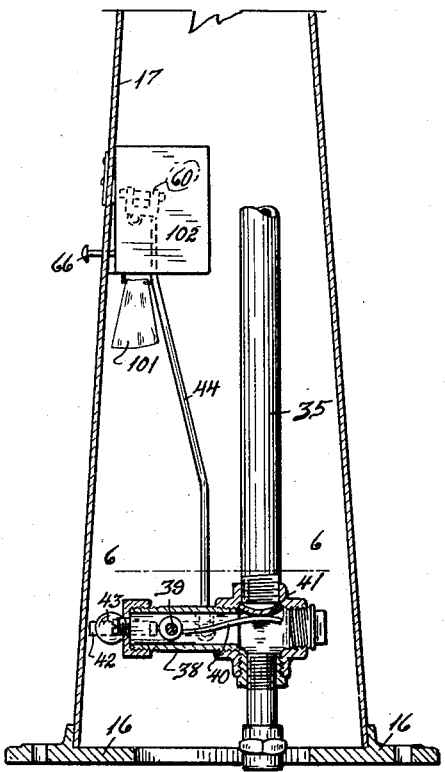

Dec. 15, 1931.  H. E. FRYE  1,836,313
LIQUID DISPENSING APPARATUS
Filed June 11, 1929   3 Sheets-Sheet 3

Inventor:
Howard E. Frye.
By Homer G. Sweet
Attorney.

Patented Dec. 15, 1931

1,836,313

UNITED STATES PATENT OFFICE

HOWARD E. FRYE, OF LYMAN, NEBRASKA

LIQUID DISPENSING APPARATUS

Application filed June 11, 1929. Serial No. 370,100.

An object of this invention is to provide an improved apparatus for the dispensing of liquids, such as gasoline and the like.

A further object of the invention is to provide an improved coin-controlled apparatus for the dispensing of liquids, such as gasoline and the like.

A further object of the invention is to provide an improved liquid dispensing apparatus adapted for automatic, coin-controlled operation to deliver a measured quantity of liquid, such as gasoline and the like.

A further object of the invention is to provide an improved liquid dispensing apparatus operable through either manual or coin control to automatically deliver a measured quantity of liquid, such as gasoline and the like.

A further object of the invention is to provide an improved liquid dispensing apparatus adapted for use in automobile service and filling stations for the dispensing of liquid fuel, said apparatus being arranged for semi-automatic operation and selective manual or coin control.

A further object of the invention is to provide an improved liquid dispensing apparatus arranged for manual control by an attendant or automatic coin control to deliver a measured quantity of liquid, such as gasoline and the like.

A further object of the invention is to provide improved adjustable means in a liquid dispensing apparatus of the character described for determining the measured quantity of liquid deliverable from said apparatus.

A further object of the invention is to provide improved automatic means for arresting the flow of liquid to the measuring compartment of a liquid dispensing apparatus of the character described.

A further object of the invention is to provide improved overflow-operated means for arresting the flow of liquid to the measuring compartment of a liquid dispensing apparatus of the character described.

A further object of the invention is to provide improved means for preventing delivery of liquid from the measuring compartment of a liquid dispensing apparatus of the character described until the measuring operation is completed.

A further object of the invention is to provide improved coin operable control means for a liquid dispensing apparatus of the character described.

A further object of the invention is to provide improved coin-operable switch-operating control means for a liquid dispensing apparatus of the character described.

A further object of the invention is to provide improved manually-operable, coin-controlled switch means for filling the liquid measuring compartment of a dispensing apparatus of the character described.

A further object of the invention is to provide improved means in combination with manually-operable, coin-controlled switch means for filling the liquid measuring compartment of a dispensing apparatus of the character described, whereby said switch means may be manually operated independently of said coin control means.

A further object of the invention is to provide a single switch in combination with a liquid dispensing apparatus of the character described, manually-operable means, with or without coin control, for closing said switch to fill the measuring compartment of said apparatus and overflow-operated automatic means for opening said switch when said measuring compartment is filled.

A further object of the invention is to provide in a coin-operated control mechanism, means for eliminating spurious coins from said mechanism prior to the operation of said mechanism by said spurious coins.

A further object of the invention is to provide improved means in a coin-operated control mechanism for measuring the thickness and diameter of the coin deposited therein, in such manner that only coins of the proper thickness and diameter can operate said mechanism.

My invention consists in the construction, arrangement and combination of elements hereinafter set forth, pointed out in my claims and illustrated by the accompanying drawings, in which—

Figure 12:
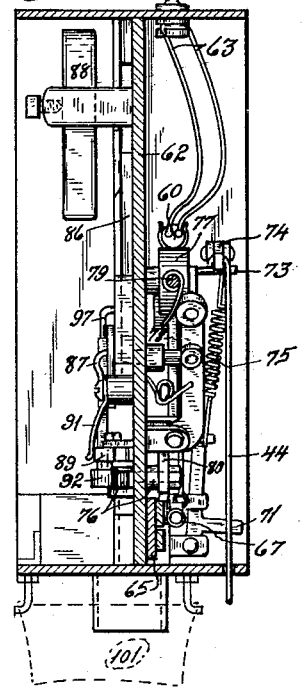
Figure 11:
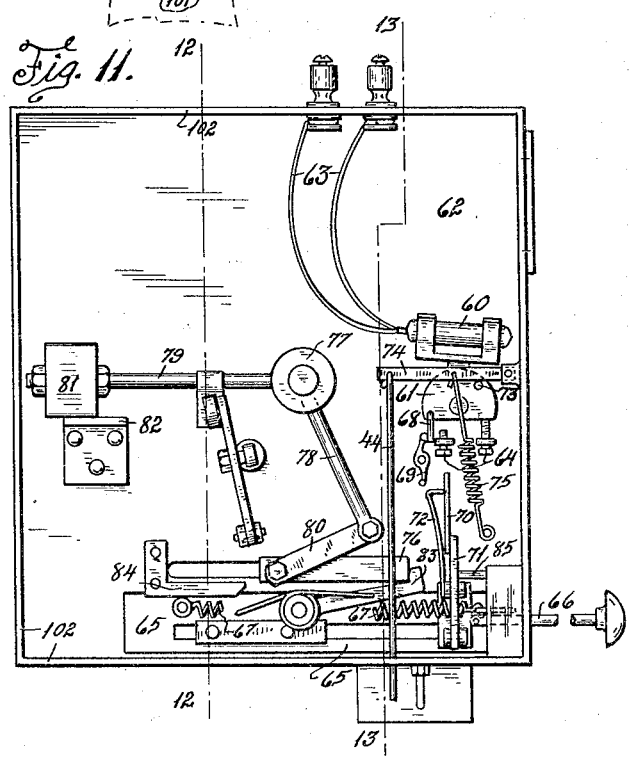
Figure 13:
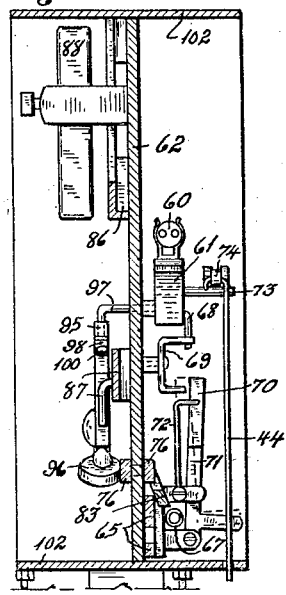

Figure 1 is a vertical section longitudinally of the improved apparatus as assembled when ready for practical use, certain parts being broken away to conserve space. Figure 2 is a vertical section, on an enlarged scale, longitudinally of the measuring compartment employed in the apparatus. Figure 3 is a top plan view of the measuring compartment, portions of the supporting base being broken away. Figure 4 is a transverse section on the indicated line 4—4 of Figure 2. Figure 5 is a fragmentary, detail section through overflow-operated, switch-actuating mechanism employed in the apparatus. Figure 6 is a fragmentary, detail section on the indicated line 6—6 of Figure 5. Figure 7 is a fragmentary, detail section through inflow-operated valve means employed in the apparatus. Figures 8 and 9 are detail elevation and section views, respectively, of sight-gauge means employed in the apparatus. Figure 10 is an elevation of one side of coin-controlled, switch-actuating mechanism employed in the apparatus. Figure 11 is an elevation of the opposite side of the mechanism shown in Figure 10. Figure 12 is a vertical section on the indicated line 12—12 of Figure 11. Figure 13 is a vertical section on the indicated line 13—13 of Figure 11.

In the construction of the improved apparatus as shown, the numeral 15 designates a storage tank adapted to receive and store liquid, said tank being of common type and of any desired size and shape and preferably located below ground in a common manner. The dispensing apparatus proper, adapted to withdraw liquid from the tank 15, measure said liquid and discharge the same into suitable containers, is shown in Figure 1 directly above the tank 15, though, as is obvious, it may be positioned at a distance from said tank and still function in the manner hereinafter described. The dispensing apparatus comprises a base 16 adapted to be mounted on or adjacent the surface of the ground and suitably supported therefrom, a hollow pedestal 17 rising from the base 16 and preferably tapered upwardly, a suitable plate 18 closing the upper end of the pedestal 17 and forming the bottom of a measuring compartment confined within a transparent cylinder 19 seated in and sealed relative to said plate 18, and a cap 20 on and closing the upper end of the cylinder 19. The foregoing construction is but typical of common practice and is susceptible of infinite variation, hence in itself forms no part of the instant invention apart from the essential operative corelation of the parts above described with the novel elements hereinafter set forth. The cap 20, as shown, may be of a construction adapted to support a finial in the form of a transparent globe 21 arranged for night illumination by means of suitably positioned electric bulbs 22, and may also carry spaced electric bulbs 23 adjacent its periphery and suitably positioned for night illumination of the cylinder 19, if and as desired.

A suction pipe 24 extends within and adjacent the bottom of the tank 15 and is provided with a check valve 25 of common form on its lower end, said pipe 24 rising from said tank through the base 16 to the interior of the pedestal 17 where it communicates with the intake port of a suction pump 26 suitably supported by and within said pedestal, said pump 26 preferably being of centrifugal type and of any construction suitable to its purpose. An electric motor 27 is supported by and within the pedestal 17 adjacent the pump 26 and in driving relation with said pump, the arrangement shown in Figure 1 including a direct driving connection between the armature shaft of said motor and the rotor shaft of said pump, and a pipe 28 communicates with the outlet port of the pump 26 and rises from said pump through the pedestal 17 and plate 18 to terminate in an open discharge end within and adjacent the top plane of the cylinder 19, said pipe 28 being sealed to the plate 18 at its intersection therewith. The motor 27 is suitably connected with an electric power line through a switch, hereinafter more specifically described, in such manner that closing of said switch completes the electric circuit through said motor, energizing and actuating the latter to drive the pump 26, thereby drawing liquid from the tank 15, through the check valve 25 and pipe 24, to said pump, whence it is lifted through the pipe 28 and discharged through the open upper end of said latter pipe into the compartment formed by the cylinder 19, it being the function of the check valve 25 to retain liquid in the pipe 24, pump 26 and pipe 28 when the motor 27 is stopped and the pump 26 not operating. In order to prevent undue agitation of liquid within the cylinder 19 while the measuring compartment is being filled, and to support elements of the invention yet to be described, a stand pipe 29, of greater diameter than the pipe 28, is mounted within the cylinder 19 in concentric relation with the projection of the pipe 28 within said cylinder and rises above the open end of the pipe 28 to terminate in a closure cap 30 above and spaced from the discharge end of the pipe 28, ports 31 being provided in the lower end of the stand pipe 29 adjacent the plate 18 so that liquid discharged from the pipe 28 within the stand pipe 29 will flow to the base of said stand pipe between the inner wall of the latter and the outer wall of the pipe 28 and be discharged into the cylinder 19 through the ports 31. To regulate the quantity of liquid retained in the compartment formed by the cylinder 19 an adjustable overflow pipe 32 is slidingly mounted through the plate 18 and vertically-disposed with one open end within the cylinder 19 and its other open end within the pedestal 17, a packing gland 33 being positioned on the plate 18 about the pipe 32 to prevent leakage of liquid through the sliding joint between said plate and pipe, and said pipe 32 being provided with a handle 34 within the pedestal 17 whereby said pipe may be manually shifted, axially, to regulate its extension within the cylinder 19, the position of the open upper end of the pipe 32 naturally determining the quantity of liquid retained within the cylinder 19. The lower open end of the pipe 32 is telescopically received in the upper end of a pipe 35 which leads from the interior of the pedestal 17 to the storage tank 15, thus providing means for the return of overflow or excess liquid from the cylinder 19 to said tank, a packing gland 36 being provided on the upper end of the pipe 35 about the pipe 32 as a sliding connection between said pipes and to prevent leakage therebetween. A door 37 is formed in one side of the pedestal 17 adjacent the handle 34 to provide easy access to said handle for the purpose of shifting the pipe 32 axially. The pipe 35 is formed with a laterally-offset housing 38 within the pedestal 17, said housing having a hollow interior intersecting and communicating with the bore of said pipe and a shaft 39 is journaled in opposite walls of said housing, spaced from and axially at right angles with the axis of said pipe, and an arm 40 is fixed to said shaft within said housing and extends across the bore of the pipe 35 to support an impact plate 41 in obstructing position across said bore, whereby overflow liquid passing through the pipe 35 will of necessity impinge on said plate 41 and deflect the arm 40 within said housing. A lever 42 is fixed to a projecting end of the shaft 39 without the housing 38 and is provided with a weight or counterbalance 43 on one end so positioned as to normally hold the arm 40 and impact plate 41 in raised position within said housing, the other end of said lever 42 being connected with one end of a pull rod 44 leading to the switch controlling the motor 27, the relation of the pull rod 44 and switch, hereinafter more specifically set forth, being such that a pull on said rod 44 serves to actuate said switch to open circuit position and stop the motor 27, thus providing automatic means for stopping said motor and the pump 26 when the cylinder 19 has been supplied with the desired quantity of liquid as determined by the setting of the overflow pipe 32, since flow through said pipe 32 acts through the pipe 35 to deflect the arm 40 and thus exert a pull on the rod 44 by virtue of the shaft 39 and lever 42.

A port 45 is formed in the plate 18 and communicates with the interior of the cylinder 19 wherethrough the liquid within said cylinder may be withdrawn therefrom under the influence of gravity, said port 45 preferably communicating through suitable fittings and connections with a flexible conduit 46 outside of the pedestal 17 and of a length sufficient to connect with automobile tanks or other containers to be filled from the apparatus, a manually-operable valve 47 preferably closing the outer end of said conduit to facilitate control of the flow of liquid therethrough. Since it is obvious that if the port 45 and valve 47 remain open while liquid is being supplied to the cylinder 19 the measuring effect of said cylinder determined by the setting of the overflow pipe 32 would be destroyed and liquid flow from said cylinder through the conduit 46 perhaps as fast as supplied by the pump 26, automatic means for closing said port 45 during the operation of filling the said cylinder are provided. The upper end of the port 45, within the cylinder 19, is formed as or provided with a valve seat 48 and a vertically-movable valve member 49 is supported on an upwardly-extending rod 50 in position to register with said seat 48 and coact therewith at times to close the port 45, said member 49 preferably being formed with an apertured guide portion 51 extending within and retained by the port 45 whereby said member 49 is positioned relative to its seat 48. A post 52 is fixed to and rises from the cap 30 at one side of the stand pipe 29 and hingedly supports a lever 53 on its upper end, one end of said lever 53 being formed with an elongated slot through which the upper portion of the rod 50 is received, a stop 54 being adjustably mounted on the upper end of said rod 50 above the lever 53 in position to be engaged by said lever at times and lift the said rod 50 and its attached valve member 49. The other end of the lever 53 extends across the cap 30 and is formed with an elongated slot in which is slidingly received the upper end of a stem 55 rising through said cap 30 from a plunger type valve 56 positioned in the upper end of the supply pipe 28, said stem 55 carrying stop means 57 between the cap 30 and lever 53 serving the double purpose of engaging the under side of said lever 53 to oscillate said lever at times and preventing the said stem from dropping through said cap 30. The plunger valve 56 is rigidly secured to its stem 55, is preferably cup-shaped in section and of a size to substantially fill the bore of the pipe 28, and is preferably provided with guide fingers or an apertured skirt portion whereby it may at all times be positioned relative to the upper end of said pipe. When the liquid within the pipe 28 is at rest, the plunger valve 56 sinks in said liquid to the limit determined by the stop means 57 engaging with the cap 30 and the lever 53 is permitted to oscillate to engage the stop means 54 on the rod 50 and lift said rod and its attached valve member 49 to open the port 45 and thus draining the compartment within the cylinder 19. When, however, the liquid in the pipe 28 is being moved upwardly therein under the influence of the pump 26, such movement of the liquid raises the plunger valve 56 up and clear of the discharge end of said pipe, causing the stop means 57 to engage and lift one end of the lever 53 and oscillating said lever to permit downward movement of the rod 50, thus carrying the valve 49 into engaging relation with its seat 48 to close the port 45, as is clearly shown in Figure 2 of the drawings. It is to be noted that so long as liquid rises in the pipe 28 the port 45 will remain closed, and when said liquid comes to rest the plunger valve 56 will descend into the liquid retained in said pipe by the check valve 25 slowly, because of the inverted cup shape of said valve and the air retained therein, thus providing ample time for the subsiding of turbulence in the cylinder 19 and the completion of the overflow operation before the valve 49 is opened by the engagement of the lever 53 with the stop means 54 and return oscillation of said lever.

Since the cylinder 19 is sealed to the plate 18 and the cap 20 is preferably sealed to the upper end of said cylinder, air must be exhausted from said cylinder as the latter is filled with liquid and such air naturally passes most readily through the pipes 32 and 35, thus aiding rapid completion of the overflow operation when such occurs. In order to prevent an air lock in the cylinder 19 retarding the draining of said cylinder through the port 45, an air vent is provided in the form of a tube 58 vertically-disposed in said cylinder with its open upper end above the highest possible level of liquid therein, the lower end of the tube 58 extending through the plate 18 and preferably communicating with the bore of the conduit 46 to prevent possible evaporation or leakage of liquid from the cylinder 19 through said tube. The tube 58 also provides a suitable support for sight-gauge means whereby the contents of the cylinder 19 may be accurately determined, one satisfactory form of such sight-gauge means being illustrated in Figures 8 and 9 of the drawings as comprising pointed plates 59 having clamping means about and vertically-adjustable relative to the said tube 58, said plates 59 being adapted to carry figures readable through the transparent wall of the cylinder 19 to denote the number of units of quantity represented by the liquid level to which the points of said plates have been set. Other and different sight-gauge means may of course be employed in the apparatus, if desired.

The apparatus thus far described presents a complete and workable liquid dispensing device and may be successfully employed without further additions, the switch for actuating the motor 27 being located in any convenient position and operated in any manner desired. However, the invention contemplates an apparatus arranged for either direct manual operation or coin-controlled, semi-automatic operation, thus providing a device operable with or without an attendant, as conditions may require, and to this end switch-actuating, coin-controlled mechanism is provided and arranged as shown in Figures 10, 11, 12 and 13 of the drawings, the position of such mechanism relative to the pedestal 17 being indicated in Figure 5. In the construction of the switch-actuating mechanism as shown in Figures 10, 11, 12 and 13, the switch element comprises a mercury tube 60, of a common type, clip-mounted on and carried by a switch block 61 pivotally mounted for limited oscillation on one side of a vertical plate or other support 62. The mercury tube 60 preferably consists of a glass cylinder sealed at each end and containing a quantity of mercury not completely filling said cylinder and spaced, metallic contact points projecting within and extending through one end of said cylinder in such manner as to both be submerged in the liquid mercury when the tube is inclined from the horizontal with the contact end of the cylinder below its plain end, reversal of the inclination of said tube causing the mercury to flow to the plain end of the cylinder and uncovering said contact points. The contact points of the tube 60 are connected with electrical conductors 63 forming part of one side of the electric circuit leading to and through the motor 27 in such manner as to close said circuit and energize said motor when the points are submerged in the mercury within said tube and open said circuit and stop said motor when the tube is inclined to uncover said points, the switch-actuating mechanism consisting of means for actuating the block 61 and tube 60 to vary the inclination of said tube, adjustable stops 64 being provided in engageable relation with the block 61 for limiting the oscillation of said block to the desired open circuit and closed circuit positions. The plate or support 62 is mounted within and rigidly secured in vertical position to the pedestal 17, and a slide bar 65 is formed with an elongated longitudinal slot whereby it is mounted for rectilinear reciprocation in a horizontal plane on the same side of the plate 62 with the switch block 61 and spaced below said switch block, said bar 65 having a manually-operable, push-rod extension 66 passing through and terminating without the pedestal 17, a spring 67 engaging between said bar 65 and an extension of the plate 62 serving to normally hold said bar at one limit of its range of travel with the push-rod 66 at its maximum extension without the pedestal. A trip pin 68 extends downwardly from the rearward portion of the block 61 in position to be engaged by one end of a rocker arm 69 at times, the other end of said rocker arm extending into the path of travel of a leaf spring 70 fixed to the upper end of an adjustable arm 71 hinged to and carried by the forward portion of the bar 65, so that, the arm 71 being adjusted to the position shown in dotted lines in Figure 13, manual actuation of the push rod 66 will cause the bar 65 to move rearwardly against the pressure of the spring 67, carrying the arm 71 rearwardly and bringing the leaf spring 70 on the upper end of said arm into contact with the lower end of the rocker arm 69, thus engaging the upper end of said rocker arm 69 with the trip pin 68 and oscillating the switch block 61 to circuit closing position of the mercury tube 60. The adjustable arm 71 may be set to the position shown in full lines in Figure 13, in which case the leaf spring 70 clears the rocker arm 69 and does not operate the switch-tripping mechanism, this latter position of the arm 71 being employed when the coin-controlled mechanism hereinafter described is to be utilized, the said arm 71 being manually adjusted to either of its two positions and retained therein by the bent spring 72. A pin 73 projects laterally from the forward portion of the switch block 61 above the pivot of said block, and a lever 74 is hinged at one end to a lateral extension of the plate 62 in position to rest on said pin 73 and extend rearwardly past the block 61 to a hinge connection with the upper end of the pull rod 44, so that, when a pull is exerted on said rod 44 through the overflow means of the apparatus, as above described, the rearward end of the lever 74 is moved downwardly against the pin 73 to oscillate the switch block 61 forwardly into open circuit position of the mercury tube 60, as clearly shown in Figure 11, a retractile coil spring 75 engaging between the lever 74 and plate 62 serving to hold said lever in contact with the pin 73 and steady the switch block 61 in either of its two positions.

The mechanism above described provides for manually-operated, direct control of the apparatus by an attendant, and the coin-controlled mechanism hereinafter described is supplemental to and operable by the slide bar 65 and push rod 66 when the arm 71 is out of contacting relation with the rocker arm 69. An elongated slot is formed in the plate 62 above, adjacent and parallel with the slide bar 65 and a slide member 76 is mounted for rectilinear reciprocation in said slot and projects laterally on each side of the plate 62. A hub 77 is pivotally mounted on the switch side of the plate 62 rearwardly of the block 61 and radially-extending arms 78 and 79 are fixed in said hub in a common plane parallel with the plane of the plate 62, the arm 78 extending adjacent the slide member 76 and having its free end pivotally connected with said slide member by means of a link 80, the arm 79 extending rearwardly from the hub 77 and supporting an adjustable weight 81 on its outer end, said weight 81 normally resting on an anvil 82 fixed to the plate 62 in which position it normally retains the slide member 76 at the forward limit of its range of travel by virtue of the connections between the hub 77 and said slide member, rearward travel of said slide member lifting the weight 81 from its position on the anvil 82 and thus storing potential energy for the return of said slide member to normal position. A spring-pressed dog 83 is carried by the slide bar 65 and is formed with a hooked end adapted to engage the forward end of the slide member 76 on the switch side of the plate 62, whereby said bar 65 and member 76 are interengaged for common actuation when the push rod 66 is operated, and a release lug 84 is secured to the plate 62 in position to engage the dog 83 and force said dog out of engagement with the member 76 when said member approaches the rearward limit of its travel, thus permitting the weight 81, which has been lifted during the rearward travel of said member, to return the latter forwardly to its normal position. It is to be noted that a stop 85 is fixed to the plate 62 in position to be engaged by the adjustable arm 71 when the latter is swung into switch-actuating position and prevent complete forward travel of the bar 65 and push rod 66, thus preventing the hooked end of the dog 83 from engaging the slide member 76 until the arm 71 is set to switch-clearing position. A coin race 86 is mounted on the side of the plate 62 away from the switch assembly and communicates with a coin drop or slot formed in and through the pedestal 17 above the push rod 66, said race being arranged to receive a coin vertically and inclined on the plate 62 to permit a coin to move therealong under the influence of gravity, suitable guide plates and fingers 87 being arranged on the plate 62 and race 86 to receive a coin after it has passed through said race and position said coin on the laterally projecting portion of the slide member 76 when said latter member is in its forward position. An aperture is formed in the outer wall of the race 86 intermediate its ends and a magnet 88 is fixed to the plate 62 in spaced relation with said aperture and in position to attract and laterally remove magnetically-susceptible spurious coins from said race. A trip lever 89 is pivotally mounted intermediate its ends on the plate 62 for oscillation in a horizontal plane above and parallel with the slide member 76, the forward end of said lever 89 being in the form of a leaf spring and carrying a needle 90 directed toward the coin position above the member 76 and normally held in spaced relation with said coin position by a spring 91 engaging the rearward end of the lever 89. A roller 92 is carried by the rearward end of the lever 89 in the path of travel of a roller 93 carried by the member 76, so that, as said member 76 is moved rearwardly, the roller 93 engages the roller 92, oscillating the lever 89 about its pivot and bringing the point of the needle 90 sharply against a coin about to be released from the member 76, the point of the needle 90 penetrating spurious soft metal coins sufficiently to withdraw said spurious coins from the mechanism on the return oscillation of the lever 89, but being stopped by coins of true metal, in which latter event the shock of impingement is absorbed by the yielding of the leaf spring end of the lever 89. A coin guide slot is formed beneath the member 76 into which the coin is permitted to drop as said member is moved rearwardly, thus positioning said coin in its guide slot in front of the forward end of the member 76 and in position to be engaged by the end of said member and moved forwardly along said slot as said member is returned to normal position by the action of the weight 81.

An L-shaped arm 94 is provided with a leaf spring extension 95 on its upper end and a roller 96 on its lower end and is hinged to the plate 62 intermediate its ends on a pivot inclined somewhat from the vertical in such manner that the weight of the roller end of said arm normally holds the roller 96 in contact with the plate 62 and the end of the spring 95 in spaced relation with said plate, the roller 96 being positioned in the path of travel of the coin impelled by the member 76 and adapted to engage said coin and be actuated by the thickness of said coin to swing the leaf spring 95 into close relation with the plate 62 and behind a trip arm 97 fixed to the switch block 61. A second L-shaped arm 98 is provided with a vertical roller 99 on its lower end and a forwardly-extending, adjustable pin 100 on its upper end and is mounted for oscillation on a horizontal pivot fixed to the plate 62 adjacent the arm 94, in such manner that the coin impelled by the member 76 will marginally engage the roller 99 and rock the arm 98 about its pivot to bring the pin 100 into contact with the spring 95 of the arm 94 and flex said spring against the trip arm 97 and rock the switch block 61 into circuit closing position of the tube 60, thus closing the power circuit to the motor 27 and energizing said motor. After actuating the arms 94 and 98 the coin drops through a vertical slot in the base of the mechanism and is received in a coin sack 101 communicating with the drop slot, the arms 94 and 98 returning to their normal positions under the influence of gravity after the coin ceases to engage the rollers 96 and 99. The switch-actuating mechanism may be enclosed in a housing 102 for better protection of said mechanism, if desired.

In the practical operation of the apparatus, the overflow pipe 32 is manually set to the desired height within the cylinder 19, the arm 71 swung to switch-engaging position, and the apparatus is ready for operation by an attendant. With the above setting, actuation of the push rod 66 moves the tube 60 to circuit closing position and energizes the motor 27, causing liquid to be pumped from the tank 15 to the cylinder 19 and automatically closing the gravity discharge from said cylinder. When the liquid has reached the top of the overflow 32 and flow is established therethrough, said flow acts on the lever 40 to exert a pull on the rod 44 and move the tube 60 to open circuit position, stopping the motor and pump, the gravity discharge from the cylinder 19 then being automatically opened as above described to permit withdrawal of the liquid from said cylinder through the conduit 46 and valve 47, whereafter the operations above set forth may be repeated. When it is desired to operate the apparatus through coin control, the pipe 32 is set to the height representing the quantity of liquid corresponding to the value of the coin for which the mechanism is designed, the lever arm 71 swung to its switch-clearing position and the apparatus will then function, upon deposit of a valid coin of the proper denomination and actuation of the push rod 66, exactly as above set forth to deliver the predetermined quantity of liquid to the cylinder 19 and permit withdrawal of said liquid from said cylinder.

Since it is obvious that the construction and arrangement of the elements comprising the apparatus are susceptible of infinite variation without departing from the spirit of the invention, I wish to be understood as being limited solely by the scope of the appended claims rather than by the illustrative showing and foregoing description.

I claim as my invention—

1. A liquid dispensing apparatus comprising, in combination, a liquid storage tank, a measuring compartment elevated relative to said storage tank, pump means and connections between said storage tank and compartment whereby the latter may be supplied with liquid from the former, a gravity discharge from said compartment, valve means within said compartment and operable by the incoming liquid to close said gravity discharge while liquid is being introduced into said compartment, and an adjustable overflow within said compartment and connected with said storage tank whereby the amount of liquid within said compartment may be regulated and excess liquid returned, by gravity, to said storage tank.

2. A liquid dispensing apparatus comprising, in combination, a liquid storage tank, a measuring compartment elevated relative to said storage tank, pump means and connections between said storage tank and compartment whereby the latter may be supplied with liquid from the former, a gravity discharge from said compartment, valve means within said compartment and operable by the incoming liquid to close said gravity discharge while liquid is being introduced into said compartment, an electric motor in driving relation with said pump means, a switch for selective control of said motor, an adjustable overflow within said compartment and connected with said storage tank whereby the amount of liquid within said compartment may be regulated and excess liquid returned to said storage tank, and means in said overflow system and operable by the flow of liquid therethrough to open said switch and stop said motor and pump means.

3. In a liquid dispensing apparatus of the character described having a liquid storage tank, a liquid measuring compartment in elevated relation with said storage tank, pump means and connections including a stand pipe within said compartment whereby said compartment may be supplied with liquid from said storage tank and overflow means adjustable within said compartment and connected with said storage tank whereby the amount of liquid within said compartment may be regulated, a gravity discharge from said compartment and automatic means operable by the incoming liquid to close said discharge while liquid is being introduced into said compartment, said automatic means comprising a support fixed to and rising from the upper end of said stand pipe, a substantially horizontal lever disposed for actuation through a vertical arc on the upper end of said support, means on one end of said lever engaging the upper end of said stand pipe and operable by the flow of liquid through said pipe for raising said end of said lever, a valve seat on the upper end of said gravity discharge and a valve operatively connected with the free end of said lever in registering relation with said valve seat and normally out of engagement therewith and operable to close said gravity discharge when said lever is actuated by said incoming liquid.

4. In a liquid dispensing apparatus of the character described, a liquid measuring compartment, means including a stand pipe within said compartment for supplying liquid thereto, an adjustable overflow within said compartment for regulating the amount of liquid therein, a gravity discharge for withdrawing the measured liquid from said compartment, a valve seat on the inner end of said gravity discharge, a substantially horizontal lever disposed for actuation through a vertical arc on the upper end of said stand pipe, means on one end of said lever engaging the bore of said stand pipe and operable by the upward movement of liquid through said bore to actuate said lever and a valve operatively connected with the free end of said lever in registering relation with said valve seat and normally out of engagement therewith and operable to close said gravity discharge when said lever is actuated by the flow of liquid within said stand pipe, said lever being balanced to automatically raise said valve and open said discharge when the flow of liquid in said stand pipe is arrested.

5. In a liquid dispensing apparatus of the character described having a liquid measuring compartment, means including a stand pipe within said compartment for supplying liquid thereto, means including an adjustable overflow within said compartment for automatically regulating the quantity of liquid therein and a gravity discharge for withdrawing the measured liquid from said compartment, means operable by the incoming liquid for closing said gravity discharge while said compartment is being filled, said latter means comprising a substantially horizontal lever supported for actuation through a vertical arc on the upper end of said stand pipe, a gravity valve operatively connected with one end of said lever engaging and normally closing the upper end of said stand pipe and operable through the rise of liquid within said stand pipe to actuate said lever, a valve seat on the inner end of said gravity discharge and a valve operatively connected with the free end of said lever in registering relation with said valve seat and normally out of engagement therewith and operable to close said gravity discharge when said lever is actuated by said gravity valve, said lever being balanced to automatically raise said discharge-closing valve and open said discharge when the flow of liquid in said stand pipe is arrested.

Signed at Denver, in the county of Denver and State of Colorado, this 1st day of May, 1929.

HOWARD E. FRYE.